3,376,168
METAL - CONTAINING GRAFT - POLYMERIZED PRODUCT AND METHOD OF MAKING SAME
Carl Horowitz, Brooklyn, N.Y., assignor to Yardney International Corp., New York, N.Y., a corporation of New York
No Drawing. Filed Aug. 2, 1962, Ser. No. 214,195
7 Claims. (Cl. 136—146)

The present invention relates to a new method of chemical grafting, i.e., graft-polymerizing polymerizable materials onto polymeric backbones. The useful products obtained by this method include ion-exchange membranes for electric batteries, fuel cells, dialysis in the desalting of sea or brackish water, removal of radioactive strontium from milk, biological separations and chromatography.

The existing methods of chemical grafting are seldom efficient. The yield of graft polymer is usually small and a large amount of homopolymer by-product is produced. Radiation-grafting techniques of the prior art require elaborate safety precautions and adversely affect the backbone polymer, e.g., by degradation. Furthermore, they are not suitable for industrial production.

Chemical methods for graft polymerizing monomers onto polymeric backbones have also been suggested in the prior art. These processes, however, are likewise inefficient in that only relatively small yields of grafted products are obtained.

It is an object of the present invention to provide an efficient and economical method for grafting polymerizable materials onto polymeric backbones.

It is also an object of the present invention to provide improved graft polymers.

Other and more detailed objects will be apparent from the following description and claims.

It has now been found that the efficiency of the graft-polymerization procedures may be greatly enhanced by the presence of metals in contact with the reactants involved in the grafting operation.

In the present invention, colloidal metal is preferably first deposited in the polymeric backbone and the material so treated subsequently placed in a solution of a polymerizable monomer or monomer mixture in presence of a suitable catalyst. The colloidal metal acts as an activator or trigger for the catalyst. Since the metal deposited on the polymer backbone is in an insoluble form, only graft polymerization takes place, and there is no homopolymerization.

The grafting can be performed conveniently at room temperature with peroxide type catalysts which are decomposed by the catalytic action of a colloidal metal, such as silver, at room temperature and the radicals formed start the grafting process.

The process of this invention is especially suitable for making ion-exchange membranes. A non-exchanging membrane such as cellophane may first be metallized thoroughly by soaking it first in a solution containing the metal ions and then the metal is precipitated with a suitable reducing agent. Subsequently, the metallized membrane is immersed in a solution of a polymerizable monomer containing functional groups capable of acting as ion-exchangers and a catalyst. Grafting takes place readily at room or elevated temperatures. The same procedure can be performed on a powdered polymer, film-forming polymer, woven polymeric fabric or polymeric yarn.

Chemical grafting in accordance with the present invention can be effected on a wide variety of polymeric backbones. Included among these are: cellulosic materials such as cellophane, cotton fabric, wood or cotton pulp, denitrated nitrocellulose, sausage casing nylon in fabric or film form, acrylic polymer (e.g., acrylonitrile fabrics), polyethylene, polypropylene and polyester fabrics. In those cases wherein the metal is deposited on the surface, grafting will only take place on this surface; to carry the grafting to the interior of the material, therefore, a suitable swelling agent should be used to deposit the metal throughout.

Colloidal silver metal is an excellent activator or trigger for the peroxide type catalysts. However, other metals such as platinum, gold, nickel or copper can be used.

The monomer used for the grafting procedure can be selected according to the results required. If good wettability, antistatic or ion-exchange properties are required, the monomer may consist of acrylic or methacrylic acids, sodium styrene sulfonate, vinyl pyrrolidone, vinyl pyridine, dimethylaminoethylmethacrylate, and vinylalkyltrimethylammonium chloride (e.g., the vinylmethyl or vinylethyl derivative). If, on the other hand, hydrophobic properties, chemical inertness or water repellency are desired, the monomers used can include methylmethacrylate, acrylonitrile, vinylacetate, vinylidene chloride, styrene, etc. If flame-proofing properties are desired, one can use a phosphonate type monomer, e.g., bis(beta-chloroethyl vinylphosphonate), etc.

Any of large variety of polymerization catalysts and particularly free-radical graft-polymerization catalysts, well known to those skilled in the art, may be used in connection with the present invention. Ammonium persulfate is of particular interest although organic peroxide catalysts such as benzoyl peroxide, lauryl peroxide, tert-butylhydroperoxide, and cumene peroxide, as well as the cerium salts (e.g., ceric sulfate, etc.) are suitable.

A combination of polymerizable monomers may also be used in the process of the present invention. If they are mutually incompatible they should first be separately dissolved in a suitable solvent and then mixed together. (Example 1 below, is an illustration of this principle.) The two solvents, however, should be compatible and at least one of them should be able to swell the polymer backbone if grafting of the internal portions of the polymer backbone is desired.

If infrared, induction or dielectric heating is used to carry out the graft-polymerization reaction, a film or other solid polymeric material is placed in a bath containing the reaction components, the solid being preferentially heated while the liquid will remain cold. Accordingly, the monomer absorbed on the surface and in the interstices of the polymeric material will react and be grafted onto the polymeric backbone. The monomer in the bulk of the liquid bath will not react to any appreciable extent.

The extent to which grafting takes place, in accordance with the present invention, will vary with the conditions; this is expressed herein as percent graft and is measured by the increase in the dry thickness of a sheet of material after treatment in accordance with this invention.

The following examples are further illustrative of the present invention:

EXAMPLE A

Solution A:
  Silver nitrate _____ grams__ 20
  Distilled water _____ cc__ 200
  Sodium hydroxide (aqueous) ____ cc. of 10% __ 50
  Ammonium hydroxide (aqueous) _cc. of 38% __ 65

Solution B:
  Formaldehyde (aqueous) _____ cc. of 40% __ 500
  Distilled water _____ cc__ 1,500

One sample each of cellophane film, denitrated nitrocellulose (sausage-casing film), and cotton fabric were immersed for 1 minute in Solution A, the excess solution being wiped off, and then immersed for 3 seconds in Solution B. Black colloidal silver was deposited throughout the film. This is the silver-containing premetallized material employed subsequently.

Example 1

Colloidal silver was deposited in a sample of .001″ thick cellophane according to Example A, using a solution of silver diamino complex (Solution A), and a solution of formaldehyde (Solution B). The black cellophane so obtained was immersed in a hot solution containing:

| | | |
|---|---|---|
| Sodium styrene sulfonate | grams | 200 |
| Water | cc | 600 |
| Glycidyl methacrylate | grams | 300 |
| Dioxane | do | 1,000 |
| Ammonium persulfate | do | 5 |

The pH of the solution was adjusted to 5 with glacial acetic acid. This solution was then heated to 85° C. and the cellophane-containing colloidal silver was maintained in this solution for 15 minutes at this temperature. During this time, the color of cellophane changes from black to light purple and its dry thickness increased from .001″ to .0019″. In order to remove any homopolymers which may have been formed, the cellophane product was washed in water and then in acetone. The amount of grafting was 92%. Sodium fusion gives a strongly positive test for sulfur indicating that a large amount of sodium styrene sulfonate was grafted as well.

Example 2

The procedure of Example 1 was folowed, except that the reaction time was 30 minutes. 117% graft was obtained.

Example 3

In place of .001″ thick cellophane, as used in Examples 1 and 2, above, a .0016″ thick cellophane was used. In 15 minutes of reaction time, there was 112% increase in thickness and weight. In 30 minutes of reaction time, there was 137% increase in thickness due to grafting.

Example 4

In place of the cellophane of Examples 1 to 3, sausage-casing material (denitrated nitrocellulose) of about the same thicknesses was used. 100% grafting was obtained in 15 minutes.

A sample of grafted cellophane with 92% graft prepared in accordance with Example 1 was subjected to an accelerated zinc-penetration test. This test measures length of time it takes for zinc dendrites to grow across a membrane during electrochemical zinc deposition. It takes 200 minutes for zinc to penetrate through cellophane in this test. On the other hand, with this 92% grafted product, it took 2,500 minutes. This property is directly related to the useful life of a silver-zinc battery since zinc penetration of the separators used in these batteries eventually causes the battery to short-circuit.

The ohmic resistance of this grafted separator is low: .040 ohm×in.$^2$ in 44% potassium hydroxide (i.e., the electrolyte in the silver oxide-zinc alkaline battery). This is believed to be due to the presence of highly polar terminals, namely strongly negative sulfonic groups. The ion-exchange capacity of the above membrane was measured and found to be 2.6–2.8 milliequivalents/grams as compared to .14 milliequivalent/gram for untreated cellophane. Hence, an excellent ion exchange-membrane is created which may be used for desalting sea water, for ion-exchange fuel cells and for separation of biological fluids.

Example 5

The procedure of Example 1 was followed, except that the monomer solution is maintained at room temperature. After 2½ hours 100% graft was obtained. After 17 hours, 126% graft was obtained on the silver-containing premetallized cellophane.

In place of the premetallized cellophane, silver cellulose prepared in accordance with U.S. Patent No. 3,013,099 was used. At room temperature after 2½ hours, 70% graft was obtained in the solution of Example 1.

Example 6

A solution was prepared containing the following:

| | | |
|---|---|---|
| Acrylic acid | grams | 20 |
| Water | cc | 80 |
| Ceric sulfate [Ce(SO$_4$).H$_2$O$_4$] (Lindsay Ceric Sulfate Code 291) | grams | 3 |
| Water | cc | 100 |

A sample of .0015″ silver-containing premetallized cellophane prepared according to Example A was dipped in the above solution and maintained just below boiling point thereof for 20 minutes. After washing in water and drying, the thickness of the material is .002″, corresponding to a 33% increase.

Example 7

A solution was prepared containing the following:

| | | |
|---|---|---|
| Vinylpyrrolidone | grams | 20 |
| Water | cc | 80 |
| Ammonium persulfate | gram | 1 |

Enough glacial acetic acid was added to give the solution a pH of 5.

A sample of .0015″ cellophane premetallized according to Example A is dipped and heated for 20 minutes just below boiling point of the treating solution. The final thickness of the treated cellophane after washing in water and drying is .0018″.

Example 8

The following materials were premetallized according to Example A and then grafted in the treating solution of Example 1: paper, cotton fabric, polypropylene fabric, polyethylene fabric, nylon fabric (nylon 6,6).

All the above materials acquired grafts as evidenced by increased wettability. In addition, they became strongly bactericidal due to presence of a silver compound.

It is important to note that during the grafting process the black colloidal silver is transformed into purple-colored silver compound which is intimately bound to the substrate and exhibits strong bactericidal properties even after repeated washings. It is insoluble in 10% nitric acid and can be leached out only by destroying the substrate in a mixture of concentrated nitric and sulfuric acid. The bactericidal properties are evident when a grafted sample of the above mentioned materials is placed on agar plates inoculated with *Staphylococcus aureus* and with *Escherichia coli*, and incubated for 24 hours. 3 to 4 mm. zones of inhibition with *Staphylococcus aureus* and *Escherichia coli* were obtained. Also due to strong electronegative charges of the sulfonic groups a positively charged ion can be easily attached. Thus, when the grafted samples above are immersed in a 10% solution of Tetrakis-(hydroxymethyl) phosphonium chloride and warmed to 90° C., the color changes to white and the material becomes fire resistant.

EXAMPLE B

| | | |
|---|---|---|
| Solution A: | | |
| Cuprous chloride | grams | 5 |
| Ammonium hydroxide | cc. of conc | 20 |
| Water | cc | 80 |
| Solution B: | | |
| Hydrazine sulfate | grams | 5 |
| Sodium hydroxide | cc. of 1 N | 300 |

Cellophane was dipped for 5 minutes in Solution A at room temperature and then for 3 minutes in Solution B at boiling point. A black colloidal copper was deposited inside the cellophane. This cellophane can be now used in place of the silver premetallized cellophane in the above examples.

Whereas the invention has been described with reference to specific forms thereof, it will be understood that many changes and modifications may be made without departing from the spirit of this invention.

What is claimed is:
1. A method for graft polymerizing a polymerizable vinyl monomer onto a backbone of an organic polymer susceptible to grafting which comprises the steps of:
   (1) depositing onto said backbone colloidal particles of a metal selected from the group consisting of silver, platinum, gold, nickel and copper in elemental form, said metal being capable of activating a free-radical-producing polymerization catalyst; and
   (2) contacting the organic backbone upon which said colloidal particles have been deposited with a solution of said monomer and said free-radical-producing polymerization catalyst to graft said monomer to said backbone.

2. A method according to claim 1 wherein said free-radical producing polymerization catalyst is selected from the group consisting of persulfates, organic peroxides and cerium salts.

3. A method according to claim 1 wherein said organic polymer susceptible to grafting is selected from the group consisting of cellulosic materials, polypropylene, polyethylene and nylon.

4. A method according to claim 1 wherein said monomer is a vinyl compound selected from the group consisting of acrylic acid, methacrylic acid, vinyl pyrrolidone, vinyl pyridine, dimethyl-aminoethyl methacrylate, vinylalkylmethyl-ammonium chloride, methyl methacrylate, acrylonitrile, vinylacetate, vinylidine chloride, styrene and sodium styrene sulfonate.

5. The graft-polymerization product produced by the process of claim 1.

6. A method of making a separator for an electrochemical system, said separator being resistant to dendritic penetration, comprising the steps of:
   (1) depositing onto the backbone of a cellophanic polymer colloidal particles of a metal selected from the group consisting of silver, platinum, gold, nickel and copper in elemental form, said metal being capable of activating a free radical producing polymerization catalyst; and
   (2) contacting the cellophanic polymer upon which said colloidal particles are deposited with a solution of a polymerizable vinyl monomer and said free-radical-producing polymerization catalyst.

7. In an electrochemical system having a separator disposed between two electrodes in an electrolyte, the improvement wherein said separator is the separator produced by the method of claim 6.

References Cited

UNITED STATES PATENTS

| | | | |
|---|---|---|---|
| 2,854,441 | 9/1958 | Mendelsohn | 260—2.1 |
| 3,054,698 | 9/1962 | Wagner | 260 |
| 3,013,099 | 6/1956 | Mendelsohn | 136—146 |
| 2,931,784 | 4/1960 | Raymond | 260—45.4 |
| 3,008,920 | 11/1961 | Urchick | 260—45.5 |
| 2,467,526 | 4/1949 | Harris | 260—45.5 |
| 3,027,346 | 3/1962 | Rugg et al. | 260—45.5 |

WILLIAM H. SHORT, *Primary Examiner.*

JAMES A. SEIDLECK, *Examiner.*

N. F. OBLON, C. A. WENDEL, M. GOLDSTEIN,
*Assistant Examiners.*